(12) United States Patent
Smith

(10) Patent No.: US 8,489,978 B2
(45) Date of Patent: Jul. 16, 2013

(54) ERROR DETECTION

(75) Inventor: David Smith, Buckinghamshire (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 454 days.

(21) Appl. No.: 12/877,022

(22) Filed: Sep. 7, 2010

(65) Prior Publication Data

US 2011/0066925 A1    Mar. 17, 2011

(30) Foreign Application Priority Data

Sep. 7, 2009  (GB) .................................. 0915598.7

(51) Int. Cl.
*G06F 11/10*    (2006.01)

(52) U.S. Cl.
USPC ........................................................ 714/805

(58) Field of Classification Search
USPC ........................................................ 714/805
See application file for complete search history.

(56) References Cited

U.S. PATENT DOCUMENTS

| | | | | |
|---|---|---|---|---|
| 5,408,644 A * | 4/1995 | Schneider et al. | ................. | 714/1 |
| 5,572,882 A * | 11/1996 | Schafer | ............................ | 62/402 |
| 5,819,109 A * | 10/1998 | Davis | ............................. | 710/15 |
| 5,860,090 A * | 1/1999 | Clark | ............................ | 711/113 |
| 6,041,423 A * | 3/2000 | Tsukerman | ...................... | 714/19 |
| 7,194,577 B2 * | 3/2007 | Johnson et al. | ................ | 711/114 |
| 7,647,526 B1 * | 1/2010 | Taylor | .......................... | 714/6.32 |
| 7,689,869 B2 * | 3/2010 | Terashita et al. | ................. | 714/42 |
| 2010/0023847 A1 * | 1/2010 | Morita et al. | .................. | 714/801 |

FOREIGN PATENT DOCUMENTS

EP  1 122 645 A1   8/2001
WO  WO 2007/089369 A2   8/2007

OTHER PUBLICATIONS

European Search Report dated Feb. 18, 2011 in connection with European Patent Application No. 10 17 5549.

* cited by examiner

*Primary Examiner* — Stephen M Baker

(57) ABSTRACT

A system and a method detects errors when writing data to a memory in a computer system. An error detection memory write request for writing an error detection value to a memory location within the memory section is issued, the error detection value being associated with the block of data. A data memory write request for writing the block of data to the memory section is issued such that at least part of the block of data is written to the memory location. A check is performed to determine whether the error detection value in the error detection memory write request corresponds to the block of data in the data memory write request.

20 Claims, 2 Drawing Sheets

ERROR DETECTION

CROSS-REFERENCE TO RELATED APPLICATIONS

The present application is related to United Kingdom Patent Application No. 0915598.7, filed Sep. 7, 2009, entitled "ERROR DETECTION". United Kingdom Patent Application No. 0915598.7 is assigned to the assignee of the present application and is hereby incorporated by reference into the present disclosure as if fully set forth herein. The present application hereby claims priority under 35 U.S.C. §119(a) to United Kingdom Patent Application No. 0915598.7.

TECHNICAL FIELD

This invention relates to the detection of errors when writing data to a memory in a computer system.

BACKGROUND

With reference to FIG. 1 there is shown a representation of part of a computer system comprising an initiator 102 and a memory 104 which are connected via a bus 106. The initiator 102 may be any component in the system capable of writing data to the memory, such as a write engine. The initiator 102 sends a write request for writing data to the memory 104 over the bus 106. The write request is received at the memory 104 and the data is written into the memory 104.

Ensuring the security and integrity of the data transmitted over the bus 106 may be a problem. The data in the write request may be corrupted in transit on the bus 106 or may be corrupted as it is written into the memory 104. The corruption of the data may be due to a poor-quality communication channel on the bus 106. Alternatively, the corruption of the data may be due to deliberate interference, such as power glitching or clock glitching. Power glitching is where the power supply in the system is affected such that data being written to the memory 104 is corrupted during the write operation. Clock glitching is where the clock signals are affected such that data being written to the memory 104 is corrupted during the write operation.

There is therefore required a method for ensuring that data is written to the memory 104 without being corrupted. In other words, there is required a method for ensuring that the data written to the memory 104 is the same as the data that was sent from the initiator 102. One method for achieving this uses error detection bits representing an error detection value, such as parity bits or some other Error Checking and Correcting (ECC) bits. The data is used to generate the error detection bits before the data is sent to the memory 104. The error detection bits correspond to the data before the data is sent to the memory 104. If the data has been modified since the error detection bits were generated, then the error detection bits will no longer correspond to the modified data. This allows the error detection bits to be used to check whether the data has been modified since the error detection bits were generated. The error detection bits are sent with the data over the bus 106 to the memory, such that the memory 104 can check that the error detection bits and the data received on the bus 106 correspond to each other.

One method for sending error detection bits with the data is to expand the number of signals on the bus to include the extra error detection bits. However, this method has some significant problems. Firstly, the expanded bus specification requires larger and more complex bus logic. Secondly, the specification of the devices using the extra error detection bits on the bus will need to be modified in order to correctly handle the extra bits.

Part of the memory's address map may be allocated for storing the error detection bits. However, this reduces the memory capacity available for the data, since some of the memory space is allocated for storing error detection bits. Furthermore, the initiator needs to be aware of the allocated location in the memory in order to send the error detection bits to the correct part of the memory. This requires the initiator to have a sufficient level of intelligence to send the error detection bits to the required memory address.

There is therefore required a method for ensuring that data is written to the memory 104 without being corrupted, which overcomes the problems in the prior art described above.

SUMMARY

In a first aspect of the present invention there is provided a method of writing a block of data to a section of memory, the method comprising: issuing an error detection memory write request for writing an error detection value to a memory location within the memory section, the error detection value being associated with the block of data; issuing a data memory write request for writing the block of data to the memory section, such that at least part of the block of data is written to the memory location; and checking that the error detection value in the error detection memory write request corresponds to the block of data in the data memory write request.

In a second aspect of the present invention there is provided a system comprising: a memory comprising a memory section; an initiator for issuing an error detection memory write request for writing an error detection value to a memory location within the memory section and issuing a data memory write request for writing a block of data to the memory section, such that at least part of the block of data is written to the memory location, wherein the error detection value is associated with the block of data; and a parity checking block for checking that the error detection value in the error detection memory write request corresponds to the block of data in the data memory write request.

In embodiments of the present invention a write request is issued for writing an error detection value to a memory location within a memory section. In some embodiments, the error detection value is actually written to the memory location. In other embodiments, the error detection value is not written to the memory location, but is intercepted and stored in a parity checking block. Data is then written to the memory section, including writing at least part of the data to the memory location. In the embodiments in which the error detection value is written to the memory location, the writing of the data to the memory location includes overwriting the error detection value in the memory location. The data may be stored in the parity checking block as it is written into the memory section. Alternatively, the parity checking block may read the data out of the memory section after it is written. The parity checking block can then check that the error detection value stored at the parity checking block corresponds with the data to ensure that the data is not corrupted. This checking step includes calculating an error detection value from the data and comparing that calculated error detection value with the error detection value stored in the parity checking block. If the calculated error detection value is the same as the stored error detection value, then the data has not been corrupted. The calculated error detection value may be calculated in real-time at the parity checking block as the data is written into the memory section, thereby avoiding the need to store the data at the parity checking block and the need to read the data out of the memory section.

After the writing process has been completed the error detection value is not present in the memory location. In some embodiments this is because the error detection value was never written to the memory location, whilst in other embodiments, it is because the data has overwritten the error detection value in the memory location. In this way, memory space is not used for storing error detection bits, so more data can be stored in the memory. In other words, the method provides an efficient way of ensuring the integrity of the data in the memory without using memory space by unnecessarily storing error detection values in the memory. Furthermore, since the error detection values are not present in the memory after the writing process is complete, the method can be used for writing data to a memory in which the integrity of the data is not checked. This advantageously allows the method to be used for writing data to different types of memory, including memories which check the integrity of the data and memories which do not check the integrity of the data.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
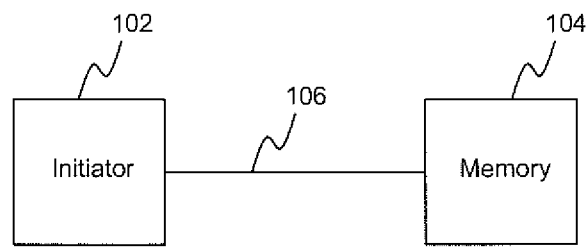
FIG. 1 is a representation of a system of the prior art.
Figure 2:
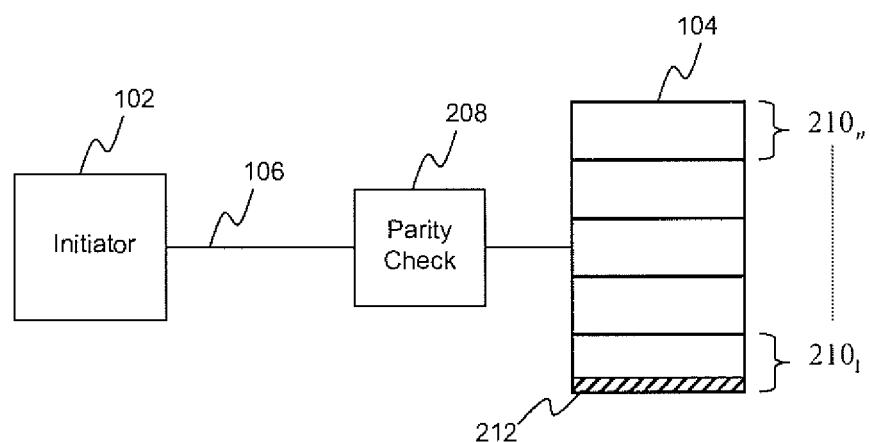
FIG. 2 is a representation of a system according to a preferred embodiment.

With reference to FIG. 2 there is now described a system according to a preferred embodiment. The system is similar to that shown in FIG. 1 in that an initiator 102 issues write requests for writing data to the memory 104 via a bus 106. The system of FIG. 2 shows a parity checking block 208 connected between the initiator 102 and the memory 104. The parity checking block 208 intercepts write requests sent on bus 106 from initiator 102 to memory 104. In other embodiments, the parity checking block 208 may monitor the write requests sent on the bus 106 without intercepting the requests. The parity checking block 208 may be part of the logic surrounding the memory 104. Alternatively, the parity checking block 208 may be a separate element to the memory 104. The parity checking block 208 preferably contains a state machine for monitoring the write requests sent to the memory 104 via the bus 106.

In the embodiment shown in FIG. 2, the memory 104 comprises a number of memory sections, or memory chunks, $210_1$ to $210_n$. The different memory sections are addressed separately in the memory 104. In preferred embodiments, the initiator 102 writes data to the memory 104 in blocks, or chunks, which are the same size as each of the memory sections $210_1$ to $210_n$. In other words, the data is written to the memory 104 one chunk at a time. Each memory section comprises a memory location into which error detection bits can be written. For example, memory section $210_1$ comprises memory location 212. Memory location 212 is a specified location in the memory section $210_1$ into which error detection bits are written.

Figure 3:
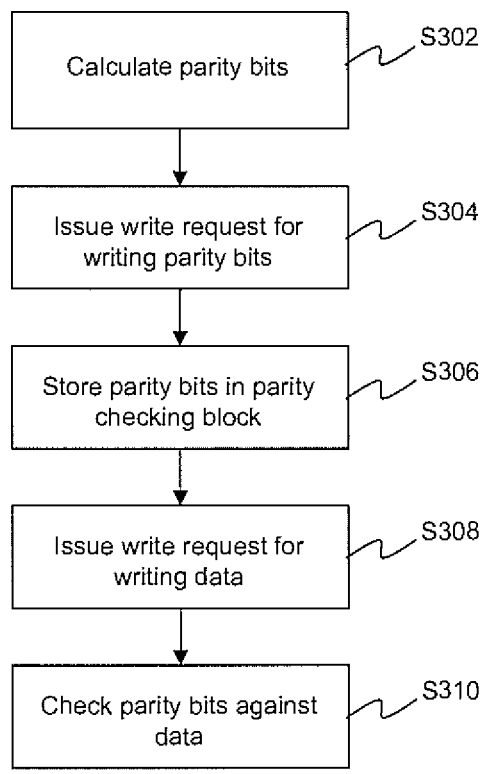
FIG. 3 is a flow chart of a process for writing data to a memory according to a preferred embodiment.

With reference to FIG. 3 there is now described a method of writing data from the initiator 102 to the memory 104. The initiator 102 is attempting to write a block of data to memory section $210_1$ of the memory 104. In step S302 the initiator 102 calculates error detection bits for the block of data. These error detection bits may be parity bits or any other type of error detection bits which can be used to check that the block of data has not been corrupted since the generation of the error detection bits.

In step S304 the initiator 102 issues a write request on the bus 106 for writing the error detection bits to the memory location 212 of the memory section $210_1$. The parity checking block 208 monitors the write requests on the bus 106. In step S306 the error detection bits in the write request are stored in the parity checking block 208. In preferred embodiments, the error detection bits are written to the memory location 212 in the memory 104. However, in alternative embodiments, the error detection bits are not written to the memory location 212 after being stored in the parity checking block 208. In further alternative embodiments, the error detection bits may be written to the memory location 212 without being stored in the parity checking block 208. The parity checking block 208 is then required to read the error detection bits from the memory location 212 before overwriting the memory location 212 with data in order to check whether the data has been corrupted.

In step S308 the initiator 102 issues a write request on the bus 106 for writing the block of data to the memory section $210_1$. The block of data is written to the memory section $210_1$. Preferably, the amount of data in the block of data is equal to the amount of data that can be stored in the memory section $210_1$ at a given moment. This means that writing the block of data to the memory section comprises writing data to the entire memory section. In this way, where the error detection value has been written to the memory location 212, the error detection value is overwritten by writing the block of data to the memory section $210_1$. For example, the memory section $210_1$ might include four word addresses (e.g. Word 0, Word 1, Word 2 and Word 3). The error detection bits might be written to one of the word addresses at memory location 212 (e.g. Word 0). The data may then be written to all of the word addresses (e.g. Words 0 to 3), thereby overwriting the error detection bits in the memory location 212 (e.g. Word 0).

In step S310 of the preferred embodiment, when the block of data has been written to the memory section $210_1$, the parity checking block 208 checks that the error detection bits issued in the write request of step S304 correspond to the block of data issued in the write request of step S308. In this way, it is ensured that the block of data has not been corrupted during the process of writing the block of data from the initiator 102 to the memory 104. In preferred embodiments, the error detection bits are stored in the parity checking block 208 and the parity checking block 208 monitors the block of data as it is written to the memory section $210_1$. The parity checking block 208 calculates an error detection value for the data that is written into the memory as the data is written. In that way, a 'running total' of an error detection value is calculated while the data is written to the memory section $210_1$. In other words, the error detection value is progressively calculated from the data block as it is received at the parity checking block 208, such that the error detection value is calculated without the need to store the block of data at the parity checking block 208. When the data has finished being written to the memory section $210_1$ the parity checking block 208 compares the calculated error detection value with the error detection value received in the write request of step S304. If the error detection values match then it is concluded that the data has not been corrupted. By calculating a running total of an error detection value for the data at the parity checking block 208 as described above, the parity checking block 208 does not need to store the data or perform any read operations from the memory 104 in order to check that the data has not been corrupted.

In some embodiments, the error detection bits are stored in the parity checking block 208 and the parity checking block 208 reads the data from section $210_1$ in order to check that the data has not been corrupted during the writing process. As described above, in other embodiments, rather than reading the data from the memory section $210_1$, the data may be stored in the parity checking block 208 when the data write request is received at the parity checking block 208. Furthermore, as described above, in some embodiments, the error detection bits may be read out of the memory location 212 in order to perform the check. The checking step is performed in the parity checking block 208 by calculating an error detection value from the block of data and checking that the calculated error detection value matches the error detection bits in the error detection write request.

If the parity checking block 208 finds that the data and the error detection bits do correspond with each other then it can conclude that the data has not been corrupted. In that case, the data in the memory section $210_1$ is known to be uncorrupted. However, if the parity checking block 208 finds that the data and the error detection bits do not correspond with each other then action is taken to preserve the integrity of the system. For example, a request could be sent to the initiator 102 requesting that the initiator 102 resends the error detection bits and the data. Additionally, or alternatively, a validity bit may be set in the system to indicate that the data in the memory section $210_1$ is not valid. When the validity bit is set the system knows that some data in the memory 104 is corrupt. The system can therefore choose not to trust the data stored in the memory 104. The system may be configured to reset when the validity bit is set. Alternatively, the system may be configured to reset the memory 104 when the validity bit is set. The system may also be configured to send a message to a user indicating that the validity bit has been set which in turn indicates that the data in the memory 104 may be corrupt. This may be particularly useful in defending against corruption to the data caused by deliberate interference to the data during the writing process.

In an alternative embodiment to that described above in which the data is written to the memory section $210_1$ before the integrity of the data is checked by the parity checking block 208, the parity checking block 208 may store the data in the write request issued by the initiator 102 and perform the checking of the data and the error detection bits before the data is written to the memory section $210_1$. In that way, the data may only be written to the memory section $210_1$ if the parity checking block 208 determines that the data is not corrupt. If the data is determined to be corrupt then the data might not be written to the memory section $210_1$ and actions to preserve the security of the system may be taken as described above.

In the embodiments described above, the write request for writing the block of data to the memory section $210_1$ is issued from the initiator 102 after the issuance of the write request for writing the error detection bits to the memory location 212. Those embodiments are preferred since they allow for both the error detection bits and the block of data to be written to the memory section $210_1$ and for the memory section $210_1$ to contain only the data at the end of the writing process. However, it is possible in other embodiments for the write request for writing data to the memory section $210_1$ to be issued after the issuance of the write request for writing the error detection bits to the memory location 212. In these other embodiments, the error detection bits are stored in the parity checking block 208, but the error detection bits are not written to the memory location 212 in the memory section $210_1$. In this way, it is ensured that at the end of the writing process, the memory section $210_1$ contains the block of data, and not the error detection bits.

In all of the embodiments, at least one of the error detection bits or the block of data must be stored in the parity checking block 208 in order for the parity checking block to check that the error detection bits correspond to the block of data. If only one of the error detection bits or the block of data is stored in the parity checking block 208 then the other one of the error detection bits or the block of data can be retrieved from the memory section $210_1$ for use in the check.

It is a particularly advantageous feature of the systems described above that at the end of the writing process the memory section $210_1$ includes the block of data but does not include the error detection bits. In this way, none of the memory space of the memory 104 is used solely for the error detection bits, and therefore all of the memory space of the memory 104 can be used for storing data. In this way the memory can efficiently store data using the method described above.

Another particularly advantageous feature of the system described above is that the same process can be used for additionally writing to an additional memory which does not employ a method for checking the integrity of the data. This is possible because there is no allocated address for error detection bits. When writing to an additional memory which does not employ a method for checking the integrity of the data, the error detection bits are written to a memory location and then the data is written to the memory section, thereby overwriting the error detection bits in the memory location in accordance with the method as described above. In this way, the result of the writing process is that the data is written to the memory section of the memory and the error detection bits are not stored in the memory. Therefore, the system can be used for writing to an additional memory which does not wish to check the error detection bits of the data. Although, the error detection bits are written to the memory, they are subsequently overwritten by the data. It is advantageous to be able to use the same mechanism for writing data to different types of memory. This simplifies the system and does not require the initiator 102 to have prior knowledge of whether the memory to which data is being written is configured to check the error detection bits of the data.

Similarly, when some initiators write data to the memory 104, the memory 104 may not want to check whether the data has been corrupted. For example, for initiators that write data of less importance to the memory 104, it may not be necessary to check that the data has not been corrupted. The method described above can be used in which the error detection bits are written to a memory location 212 and then the data is written to the memory section $210_1$, thereby overwriting the error detection bits in the memory location 212. In this way, the result of the writing process is that the data is written to the memory section $210_1$ of the memory 104 and the error detection bits are not stored in the memory. There may be no need to check that the error detection bits correspond to the data. For example, the parity checking block 208 may only check that the error detection bits correspond to the block of data when the data represents keys for use in decrypting information or when the data represents other information which has high security requirements. For other types of data being written to the memory 104 it may not be necessary to check the integrity of the data. In preferred embodiments, where the integrity of the data does not need to be checked, the write requests are simply passed through to the memory 104 without any monitoring at all by the parity checking block 208. In this way, the error detection bits are not stored at the parity checking block 208.

Furthermore, by using a memory location 212 for the error detection bits that is within the memory section $210_1$ to which the data is to be written, the initiator 102 does not require a high level of intelligence in order to write the data to the memory 104. The initiator 102 just needs to send the error detection bits to be written into a memory location 212 within the memory section $210_1$, for example into the first word of the memory section $210_1$. If for example, a different memory section of the memory 104 was dedicated to storing error detection values, such that the error detection values were stored in a different memory section to the memory section $210_1$ into which the data is to be written, then the initiator 102 would need some extra intelligence in order to determine where the error detection bits should be sent. Furthermore, by sending the error detection bits to a different memory section to the memory section $210_1$ into which the data is to be written, the error detection bits are not overwritten by the writing of the data into the memory section $210_1$. In this way, some of the memory 104 will be used for storing the error detection bits after the writing process has been completed. This therefore reduces the memory space available for storing data.

Advantages of the system include allowing the memory space available for data to be uncompromised by the inclusion of error detection bits, and achieving this without requiring extra signals in the bus 106. The method would usually be used for writing only data considered to be of high importance to the memory 104, such that any extra time and write cycles required to write the error detection bits at a different time to writing the data does not present a problem in terms of use of system resources.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of writing a block of data to a section of memory, the method comprising:
    issuing an error detection memory write request for writing an error detection value to a memory location within the memory section, the error detection value being associated with the block of data;
    issuing a data memory write request for writing the block of data to the memory section, such that at least part of the block of data is written to the memory location; and
    checking that the error detection value in the error detection memory write request corresponds to the block of data in the data memory write request.

2. The method of claim 1, further comprising writing the error detection value to the memory location, whereby it is overwritten by the at least part of the block of data written to the memory location.

3. The method of claim 1, further comprising intercepting the error detection memory write request such that the error detection value is prevented from being written to the memory location.

4. The method of claim 1, wherein the issuing of the data memory write request is subsequent to the issuing of the error detection memory write request.

5. The method of claim 1, further comprising writing the block of data to the memory section such that data is written to the entire memory section.

6. The method of claim 1, wherein the amount of data in the block of data is equal to the amount of data that can be stored in the memory section at a given moment.

7. The method of claim 1, wherein if the error detection value in the error detection memory write request does not correspond to the block of data in the data memory write request then the method further comprises setting a validity bit to indicate that the block of data is not valid.

8. The method of claim 1, further comprising:
    storing one of the error detection value and the block of data at an error checking block separate from the memory; and
    receiving the other of the error detection value and the block of data at the error checking block, wherein said checking step is performed by the error checking block.

9. The method of claim 8, further comprising receiving the error detection memory write request at the error checking block, wherein the error detection value is stored at the error checking block and said receiving step comprises reading the block of data from the memory section.

10. The method of claim 8, wherein the checking comprises:
    calculating a second error detection value from the block of data; and
    comparing the second error detection value with the error detection value in the error detection memory write request.

11. The method of claim 10, wherein the error detection value is stored at the error checking block, the method further comprising receiving the data memory write request at the error checking block, wherein said calculating step comprises progressively calculating the second error detection value from the block of data as it is received at the error checking block, such that the second error detection value is calculated without storing the block of data at the error checking block.

12. A system, comprising:
    a memory comprising a section of the memory;
    an initiator configured to issue an error detection memory write request for writing an error detection value to a memory location within the memory section and to issue a data memory write request for writing a block of data to the memory section, such that at least part of the block of data is written to the memory location, wherein the error detection value is associated with the block of data; and a parity checking block configured to check that the error detection value in the error detection memory write request corresponds to the block of data in the data memory write request.

13. The system of claim 12, further comprising a bus connecting the initiator to the parity checking block and configured to transfer the error detection memory write request and the data memory write request to the parity checking block.

14. The system of claim 12, wherein the parity checking block is separate to the memory and is configured to:
   store one of the error detection value and the block of data; and
   receive the other of the error detection value and the block of data.

15. The system of claim 12, wherein the parity checking block is configured to:
   calculate a second error detection value from the block of data and
   compare the second error detection value with the error detection value in the error detection memory write request.

16. The system of claim 13, wherein the parity checking block comprises a state machine configured to monitor the write requests sent to the memory through the bus.

17. The system of claim 12, wherein the initiator is configured to calculate the error detection value for the block of data.

18. The system of claim 17, wherein the error detection value comprises parity bits that can be used by the parity checking block to determine whether the block of data has not been corrupted since the calculation of the error detection value.

19. The system of claim 12, wherein the parity checking block is configured to send a request to the initiator to resend the error detection value and the block of data when the check fails.

20. The system of claim 12, further comprising a validity bit indicating that the data in the memory section is not valid.

* * * * *